United States Patent Office 3,348,997
Patented Oct. 24, 1967

3,348,997
POLYVINYL ALCOHOL, ALKYLENEIMINE, EPI-
CHLOROHYDRIN CONDENSATION PRODUCT
AND METHOD OF FORMING CELLULOSIC
WEBS THEREWITH
Paul Lagally, Annapolis, Md., and John W. Brook, Plainfield, N.J., assignors to Chemirad Corporation, East Brunswick, N.J., a corporation of Delaware
No Drawing. Filed June 29, 1966, Ser. No. 561,334
13 Claims. (Cl. 162—164)

This application is a continuation-in-part of our copending application Ser. No. 340,843, filed Dec. 31, 1963, for "New Polyvinyl Alcohol Condensation Products and Process of Making and Using Same," now abandoned.

The present invention relates to compounds for improving the properties of fibrous cellulosic materials, and more particularly, it relates to new and valuable reaction products of polyvinyl alcohol, their process of manufacture, and their use.

Polyvinyl alcohol has been known to impart many desirable properties, such as water absorbency, improved tensile strength, and other strength properties to materials treated with it. However, it is not incorporated in fibrous cellulosic materials as a "wet-end" additive, but rather, is applied to the formed sheet or article. In general, this is because of its lack of substantivity to the fibrous surfaces of these materials. Additionally, polyvinyl alcohol is usually difficult to handle in an aqueous solution, because of its strong tendency to cause foaming.

It is one object of the present invention to provide a means of improving the properties of fibrous cellulosic materials through the incorporation of polyvinyl alcohol reaction products.

It is another object of the present invention to provide means for rendering polyvinyl alcohol copolymers and compounds substantive to fibrous cellulosic materials.

A further object of the present invention is to provide new polyvinyl alcohol reaction products which are useful in improving the properties of fibrous cellulosic materials.

A still further object of the present invention is to provide a simple and effective process for producing these new polyvinyl alcohol reaction products.

These and other objects of the present invention, and the advantages realized, will become apparent from the following description.

It has been found that new and useful products for improving the properties of fibrous cellulosic materials are obtained by condensing:

(a) Polyvinyl alcohol, or copolymers of polyvinyl alcohol and unsaturated carboxylic acids or their esters, such as acrylic acid and methacrylic acid; or copolymers of polyvinyl alcohol with copolymerization products of vinyl acetate and unsaturated carboxylic acids or their esters, such as acrylic and methacrylic acids, followed by saponification, with (b) An alkylenimine, either polymeric or monomeric and with (c) Compounds having epoxy groups or groups convertible into epoxy groups, such as epihalohydrins, di- or polyepoxides and di- or polyhalohydrins.

The condensation products described above, formed from polyvinyl alcohol, or the copolymers of polyvinyl alcohol with other materials, particularly carboxylic acids, are extremely useful in imparting high wet strength to fibrous cellulosic materials made from pulp treated with these condensation products. Further, improvement in various properties, including wet strength, are obtained when these condensation products are applied to a finished paper. However, because of the solubility of these condensation products in water, and their affinity for cellulose, they are especially useful for addition to the paper pulp, prior to forming the finished paper.

The preferred reaction products are those formed by the condensation of polyvinyl alcohol, polyethylenimine, and compounds having epoxy groups or groups convertible into epoxy groups, particularly epihalohydrins, such as epichlorohydrin. These products can be formed either by the reaction of the polyvinyl alcohol with the polyethlyenimine-group compound already formed, or by reacting the polyvinyl alcohol with polyethylenimine and thereafter treating the resulting product with a compound having epoxy groups or groups convertible into epoxy groups.

Further, the product can be formed by reacting polyvinyl alcohol, or a copolymer containing polyvinyl alcohol, as described above, with a monomeric ethylenimine, and treating that product with a compound containing epoxy groups or groups convertible into epoxy groups. However, the monomeric ethylenimine cannot be reacted with the epoxy group containing material for subsequent reaction with the polyvinyl alcohol material.

As noted above, the polyvinyl alcohol material which is employed in forming the product of the present invention can comprise a copolymer of polyvinyl alcohol and an unsaturated carboxylic acid. The carboxylic acid can contain up to about 30 percent acetyl groups, and in addition between tbout 1 percent and 10 percent carboxyl groups. Included among such materials are the polymerization products of vinyl acetate and acrylic or methacrylic acid esters, which are then saponified.

The alkylenimine employed in forming the product of the present invention is preferably polyethylenimine. The polyethylenimine should have a degree of polymerization between about 500 and 3,000, preferably between about 800 and 1,500. Other polyalkylenimines which can be employed include homopolymers of 1,2-propylenimine, 1,2-butylenimine, 2,3-butylenimine, and similar C-substituted alkylenimines, and copolymers of these imines with ethylenimine. As previously noted, the alkylenimine employed can also be a monomer, preferably ethyenimine.

The preferred compound having epoxy groups or groups convertible into epoxy groups is epichlorohydrin. However, other compounds falling within this generic class can also be employed, including, for example, dichlorohydrin, vinylcyclohexene dioxide, dicyclopentodiene dioxide, butadiene dioxide, and others.

If the polyalkylenimine-epoxy group containing compound is to be formed prior to reaction with the polyvinyl alcohol, it is preferably formed by reacting the polyalkylenimine and the epoxy group containing material in a dilute aqueous solution. The polyalkylenimine and the epoxy group containing material are mixed at a temperature of about 0° C. and are allowed to warm to a temperature of from about 10 to 15° C. over a period of from about 1 to 10 hours. The mixture is then warmed slowly to a temperature below 50° C., for example, about 45 to 50° C., and is heated at that temperature for about 1 hour to speed the reaction. The solution is maintained at this temperature until a pH of 7 is indicated by a pH meter, usually fo rabout 1 hour. It is then cooled to 25° C. for further reaction. The result is a copolymeric product which is not completely cured, but is curable on use.

Additionally, as has been stated previously, the products of the present invention can be formed by first reacting polyvinyl alcohol with polyethylenimine, and thereafter reacting that reaction product with a compound containing epoxy groups or groups convertible into epoxy groups. The reaction between the polyvinyl alcohol and the polyethylenimine is also conducted in dilute aqueous solution and, after mixing is completed, the solution is generally heated to reflux temperature to complete the reaction. This aqueous solution is then cooled and the compound containing epoxy groups or groups convertible into epoxy groups is then added, the solution then being held at a point not substantially above 50° C.

Whichever method of formation is employed, completion of the reaction is indicated by the pH of the solution, as shown by a pH meter, which should be allowed to reach a value between about 6.0 and 7.0, preferably about 6.5.

After the copolymer of the present invention is formed, and the pH indicated above is reached, the solution is cooled to room temperature. The pH of the solution is then adjusted to between 4.5 and 7.0, for example, employing a dilute solution of a mineral acid such as HCl. With such an adjustment, the solution is stable for at least six months. By comparison similar solutions gel in less than half that time.

The ratios of the polyvinyl alcohol, polyalkylenimine, and compounds containing epoxy groups or groups convertible into epoxy groups may be varied over a broad range. Employing polyvinyl alcohol, polyethylenimine, and epichlorohydrin, the mole ratios can vary from 1:1:0.8 to 1:4:8, and preferably is approximately 1:4:4. This will provide a copolymer having less than about 27 percent polyvinyl alcohol, by weight, based upon the total, and a nitrogen percentage in the range of from about 5.8 to 14 percent. It has been found that similar copolymers which contain about 30 percent, or more, of polyvinyl alcohol will not satisfactorily perform as a wet strength improving agent for cellulosic material and, in fact, the use of such amounts of polyvinyl alcohol tends to inhibit the performance of the reaction product as a wet strength agent. Often, such material becomes solid during processing.

The new products of the present invention have proven of considerable value in the process of manufacturing paper. In particular, the copolymer of polyvinyl alcohol, polyethylenimine, and epichlorohydrin, when added to paper pulp, yields a finally formed paper of excellent wet strength. In addition, there is a considerable increase in retention. Fine paper fibers are retained, as well as filler materials, such as clay, dyes and pigments. Because the new products of the present invention tend to deposit (pack) paper fines as well as the filler materials, dyes and pigments into the sheet, the white water is considerably lower in solids content. Further, the copolymeric materials of the present invention have proven of some value as flocculating agents.

Further, it has been found that the new copolymeric reaction products of the present invention are useful in increasing the retention of sizing materials on paper, including sizing materials such as alkyl ketene dimers. The reaction products can also be employed to improve the dyeability of textiles, paper, and other cellulosic materials. Of particular interest, it was unexpectedly discovered that these new products can be employed not only in neutral and alkaline media, but also with acid paper pulp, thus providing the improved properties over a broad range of paper pulp pH's. The product is relatively insensitive to pH for all of the advantages which it provides, in a pH range of from about 3 to 9.5, and particularly insensitive in the preferred pH range of about 4 to 8.5. It is also of interest that white paper, formed from pulp treated with the product of the present invention, does not yellow with aging, while papers treated with standard wet strength agents have a considerable tendency to yellow. When the product of the present invention is employed in a neutral or alkaline system, a particular advantage is gained in that the corrosion of the paper making machinery is greatly reduced and a softer paper, with less embrittlement of the cellulosic fibers, is obtained.

The new copolymers of polyvinyl alcohol, ethylenimine, monomeric or polymeric, and epichlorohydrin are usually employed in the form of aqueous solutions. The concentration of the copolymer in the solution should range from about 10 percent to 25 percent. The copolymer solution can be applied to the cellulosic material at normal processing temperatures, and the cellulosic fibrous material formed can be cured employing heat, or under other normal processing conditions, including aging.

The following examples are illustrative of the present invention, but should not be considered as limiting in any way its full scope as covered in the appended claims.

*Example 1*

A quantity of 730 parts, by weight, of a 4 percent solution of polyethylenimine was cooled below 10° C. and a quantity of 63 parts of epichlorohydrin was added, under agitation. While continuing agitation, the mixture was allowed to react for a period of about 2 hours. The temperature was then raised to about 50–52° C. and the reaction allowed to continue for another 2 hours. While maintaining the temperature at about 50° C., a quantity of 81 parts, by weight, of a 10 percent aqueous solution of polyvinyl alcohol (Colton "FH–400") was added, with stirring. Stirring was continued for about 1 hour when a pH meter indicated a value of 6.5. The solution was then cooled to room temperature and its pH adjusted, employing a 10 percent solution of HCl, to about 5.0. For use in cellulosic fibrous materials, the thus produced solution can be used as such, or may be further diluted. The mole ratio of polyvinyl alcohol to polyethylenimine to epichlorohydrin is 1:4:4.

*Example 2*

A quantity of 100 parts, by weight, of a 10 percent aqueous solution of polyethylenimine and a quantity of 100 parts, by weight, of a 10 percent aqueous solution of polyvinyl alcohol (Colton "FH–500") were mixed at room temperature and then heated to reflux for 1 hour. The resulting solution was cooled to room temperature and to it were added 190 parts, by weight, of water and 21.3 parts, by weight, of epichlorohydrin. This mixture was heated, with stirring, to about 50° C. for 30 minutes at which time a pH meter indicated a value of 6.65. The resulting solution was cooled to room temperature and its pH adjusted to about 5.5. It could be used as such for treatment of cellulosic fibrous materials, or could be further diluted. The mole ratio of polyvinyl alcohol to polyethylenimine to epichlorohydrin in this example was 1:1:1.

*Example 3*

Employing processes similar to those described above, reaction products were prepared as aqueous solutions, with the approximate mole ratios of polyvinyl alcohol to polyethylenimine to epichlorohydrin being as shown in Table I:

TABLE I

|  | Polyvinyl Alcohol | Polyethylenimine | Epichlorohydrin |
|---|---|---|---|
| Compound Formed by Method of Example 1: |  |  |  |
| (1) | 1 | 4 | 4 |
| (2) | 1 | 4 | 2 |
| (3) | 1 | 4 | 8 |
| Compound Formed by Method of Example 2: |  |  |  |
| (4) | 1 | 1 | 1 |
| (5) | 1 | 2 | 2 |
| (6) | 1 | 1 | 0.8 |
| (7) | 1 | 2 | 1.6 |
| (8) | 1 | 3 | 3 |
| (9) | 1 | 1.5 | 1.5 |
| (10) | 1 | 3 | 2.4 |
| (11) | 1 | 1.5 | 1.2 |

The compounds described as (1) and (4), above, are the materials of Examples 1 and 2, respectively.

Example 4

Employing the procedure of Example 2, and the same polyvinyl alcohol, a product of the present invention was formed employing monomeric ethylenimine. A quantity of 100 parts of ethylenimine was first reacted with 33 parts of polyvinyl alcohol under the conditions described in Example 2, in the presence of hydrogen chloride, a standard catalyst for this reaction. To the product formed from this reaction a quantity of 216 parts of epichlorohydrin was added and processing completed as in Example 2. The approximate mole ratio of polyvinyl alcohol to ethylenimine to epichlorohydrin was 1:3:3.

Example 5

Several of the products shown in Table I were added to paper pulp to demonstrate the improvement in wet strength of a paper formed from a so-treated pulp. The pulp employed was a bleached hardwood sulfite of 25° S.R. freeness, and the particular compound and percentage added are as indicated in Table II. Hand sheets were formed from each of the treated solutions, were subjected to a curing cycle of 10 minutes at 120° C., after normal drying, and were conditioned at 21° C. and 50 percent R.H. Dry strength was then tested on a Scott Model X Tensile Tester and wet strengths were run on the same tester, following a 15 minute soak in water. The results of the strength tests are also indicated in Table II.

TABLE II

| | Percent Compound Added | Tensile Strength (lb./in.) | |
|---|---|---|---|
| | | Dry | Wet |
| Compound of Table I: | | | |
| None (control) | | 2.09 | .06 |
| (1) | 0.5 | 2.72 | .39 |
| (1) | 1.0 | 2.62 | .36 |
| (1) | 3.0 | 3.08 | .40 |
| (3) | 0.5 | 2.6 | .29 |
| (3) | 1.0 | 2.51 | .33 |
| (3) | 3.0 | 2.95 | .38 |
| (4) | 0.5 | 2.15 | .30 |
| (4) | 1.0 | 2.50 | .37 |
| (4) | 3.0 | 2.24 | .31 |
| (6) | 0.5 | 2.12 | .41 |
| (6) | 1.0 | 2.64 | .45 |
| (6) | 3.0 | 2.99 | .40 |
| (8) | 0.5 | 3.00 | .31 |
| (8) | 1.0 | 2.67 | .40 |
| (8) | 3.0 | 2.78 | .41 |

Thus, it can be seen that with no impairment of the dry strength and, in fact, significant improvement in some cases, the wet strength of a paper formed from a pulp treated with a product of the present invention is increased by a factor of from about 5 to 7. Similar results are obtained employing the product of Example 4.

Example 6

The ability of the compounds of the present invention to improve the wet strength of paper produced from pulps of widely varying pH's is demonstrated in this example. The pulp was a bleached hardwood kraft paper of 30° S.R. freeness and the product was that formed according to Example 1, in amounts as indicated in Table III. The sheets formed from the pulp were cured at 130° C. for 5 minutes and were then conditioned at 21° C. and 50 percent R.H. They were then tested as described in Example 5, except that the soak time for the wet tensile strength tests was 10 minutes. The pH of each of the solutions to which the product of the present invention was added is indicated in the table.

TABLE III

| pH | Percent Additive | Tensile Strength (lb./in.) | |
|---|---|---|---|
| | | Dry | Wet |
| 8.4 | 0 | 20.3 | 0 |
| 8.4 | 1 | 29.1 | 5.44 |
| 8.4 | 3 | 31.9 | 6.90 |
| 7.0 | 0 | 17.7 | 0 |
| 7.0 | 1 | 28.2 | 4.33 |
| 7.0 | 3 | 31.4 | 7.70 |
| 5.5 | 0 | 24.8 | 0 |
| 5.5 | 1 | 28.2 | 5.50 |
| 5.5 | 3 | 27.0 | 7.19 |
| 4.5 | 0 | 20.6 | 0 |
| 4.5 | 1 | 28.7 | 4.07 |
| 4.5 | 3 | 31.0 | 7.95 |

Again the striking rise in the wet strength of papers formed from pulps treated with the product of the present invention is demonstrated. In particular, this significant rise is found here with pulps having widely varying pH values. Similar results are obtained employing the product of Example 4.

Example 7

The ability of the copolymers of the present invention to improve the filler retention and size retention of cellulosic fibrous products is demonstrated in this example. The pulp was a mixed bleached pulp and to it were added 5 percent titanium dioxide and an alkyl ketent dimer paper sizing agent (sold under trademark "Aquapel" by Hercules Powder Company) or a commercial rosin sizing agent. A quantity of 0.5 percent of the material formed according to Example 1 was employed, except for one run which employed 1.5 percent of a commercial urea formaldehyde resin. The particular additives employed, the filler retention, the size retention (according to TAPPI RC-72), and the wet strength retention as compared to the dry strength, are shown in Table IV.

TABLE IV

| Additive | Filler Retention (Percent) | Sizing in Seconds (in 2% NaOH) | Wet Strength (W/D in Percent) |
|---|---|---|---|
| 1.5% urea formaldehyde, 1.25% rosin size, alum (pH 5) | 50 | 2 | 26 |
| 0.5% product of Example 1, 1.25% rosin size, alum (pH 5) | 56 | 2 | 22 |
| 0.5% product of Example 1, 1.25% rosin size, alum (pH 7) | 46 | 4 | 28 |
| 0.5% product of Example 1, 0.15% "Aquapel" (pH 7) | 81 | 11 | 30 |

Example 8

Employing the process described in Example 1, a modified polyvinyl alcohol having about 28 percent residual acetyl groups and 3 percent residual carboxy groups ("RS 4888" sold by Shawinigan Resins Corp.) was reacted with the reaction product of polyethylenimine and epichlorohydrin. The final product was contained in a 10 percent concentration in aqueous solution and had a pH of 6.2. The molar ratio of polyvinyl alcohol to polyethylenimine to epichlorohydrin was 1:2:2.5.

While specific formulations and conditions have been shown and described, these should not be considered as limiting in any way the full scope of the present invention as covered in the appended claims.

We claim:

1. A water-soluble condensation product of polyvinyl alcohol, alkylenimine, and epichlorohydrin wherein the molar ratio of said polyvinyl alcohol to said alkylenimine to said epichlorohydrin is in the range of from 1:1:0.8 to 1:4:8.

2. The product of claim 1 wherein the alkylenimine is polyethylenimine.

3. The product of claim 2 wherein the molar ratio of polyvinyl alcohol to polyethylenimine to epichlorohydrin is approximately 1:4:4.

4. The product of claim 1 wherein said polyvinyl alcohol is a modified polyvinyl alcohol containing up to about 30 percent acetyl groups and between about 1 percent and 10 percent carboxy groups.

5. In a process of improving the properties of cellulosic sheet material, the steps which comprise adding to an aqueous cellulosic fiber pulp a condensation product of polyvinyl alcohol, alkylenimine, and epichlorohydrin, wherein the molar ratio of said polyvinyl alcohol to said alkylenimine to said epichlorohydrin is in the range of from 1:1:0.8 to 1:4:8, forming the cellulosic sheet material from the thus treated cellulosic fiber pulp, and curing the resulting sheet material.

6. The process of claim 5 wherein cellulosic fiber pulp is paper pulp and the cellulosic sheet material is paper.

7. The process of claim 5 wherein said alkylenimine is polyethylenimine.

8. The process of claim 7 wherein the ratio of said polyvinyl alcohol to said polyethylenimine to said epichlorohydrin is about 1:4:4.

9. In a process of improving filler retention and sizing of cellulosic sheet material, the steps which comprise adding to an aqueous cellulosic fiber pulp a condensation product of polyvinyl alcohol, alkylenimine, and epichlorohydrin, wherein the molar ratio of said polyvinyl alcohol to said alkylenimine to said epichlorohydrin is from 1:1:0.8 to 1:4:8, admixing filler material and sizing agent into said pulp mixture, forming the cellulosic sheet material from the thus treated cellulosic fiber pulp, and curing the resulting sheet material.

10. The process of claim 9 wherein the cellulosic fiber pulp is paper pulp and the cellulosic sheet material is paper.

11. The process of claim 9 wherein the sizing agent is an alkyl ketene dimer.

12. The process of claim 9 wherein said alkylenimine is polyethylenimine.

13. The process of claim 12 wherein the molar ratio of said polyvinyl alcohol to said polyethylenimine to said epichlorohydrin is about 1:4:4.

References Cited

UNITED STATES PATENTS

| | | | |
|---|---|---|---|
| 2,849,411 | 8/1958 | Lehmann et al. | 260—2 |
| 3,105,058 | 9/1963 | Osugi et al. | 260—836 |
| 3,142,532 | 7/1964 | Fukushima et al. | 260—2 |

FOREIGN PATENTS

| | | |
|---|---|---|
| 824,191 | 11/1959 | Great Britain. |

S. LEON BASHORE, *Primary Examiner.*